US009784585B2

(12) United States Patent
Fausten

(10) Patent No.: US 9,784,585 B2
(45) Date of Patent: Oct. 10, 2017

(54) AUTOMATIC DRIVING OF A ROUTE

(71) Applicant: Robert Bosch GmbH, Stuttgart (DE)

(72) Inventor: Michael Fausten, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/782,249

(22) PCT Filed: Dec. 12, 2014

(86) PCT No.: PCT/EP2014/052681
§ 371 (c)(1),
(2) Date: Oct. 2, 2015

(87) PCT Pub. No.: WO2014/161683
PCT Pub. Date: Oct. 9, 2014

(65) Prior Publication Data
US 2016/0047660 A1 Feb. 18, 2016

(30) Foreign Application Priority Data

Apr. 3, 2013 (DE) .......................... 10 2013 205 840

(51) Int. Cl.
*G01C 21/34* (2006.01)
*B62D 15/02* (2006.01)
(Continued)

(52) U.S. Cl.
CPC .......... *G01C 21/34* (2013.01); *B60W 30/182* (2013.01); *B60W 50/12* (2013.01); *B62D 15/025* (2013.01);
(Continued)

(58) Field of Classification Search
CPC .......... B60W 50/12; B60W 2050/046; B60W 2050/0089; B60W 30/182;
(Continued)

(56) References Cited

U.S. PATENT DOCUMENTS 5,612,883 A 3/1997 Shaffer et al.
8,260,482 B1 9/2012 Szybalski et al.
(Continued)

FOREIGN PATENT DOCUMENTS

CN 102027519 A 4/2011
JP H03273405 A 12/1991
(Continued)

OTHER PUBLICATIONS

Thorsten Luettel et al. : << Autonomous Ground Vehicles Concepts and a Path to the Future >>, Proceedings of the IEEE, Bd. 100, No. Special Centinnial Issue, May 13, 2012, pp. 1831-1839.
(Continued)

*Primary Examiner* — Yuen Wong
(74) *Attorney, Agent, or Firm* — Norton Rose Fulbright US LLP; Gerard Messina

(57) ABSTRACT

A method for automatically driving a predetermined route includes the steps of scanning route data and environmental data while the route is being driven manually, determining an automatic driving strategy based on the scanned data, comparing the automatic driving strategy to the manual driving strategy and enabling the automatic driving of the route if the automatic driving strategy differs by less than a predetermined measure from the manual driving strategy.

8 Claims, 3 Drawing Sheets

(51) Int. Cl.
*B60W 30/182* (2012.01)
*G08G 1/01* (2006.01)
*G08G 1/0967* (2006.01)
*B60W 50/12* (2012.01)
*G05D 1/02* (2006.01)
*G05D 1/00* (2006.01)
*B60W 50/04* (2006.01)
*B60W 50/00* (2006.01)

(52) U.S. Cl.
CPC ......... *G05D 1/0088* (2013.01); *G05D 1/0221* (2013.01); *G05D 1/0274* (2013.01); *G05D 1/0278* (2013.01); *G08G 1/0112* (2013.01); *G08G 1/0129* (2013.01); *G08G 1/096775* (2013.01); *G08G 1/096791* (2013.01); *B60W 2050/0074* (2013.01); *B60W 2050/0089* (2013.01); *B60W 2050/046* (2013.01); *B60W 2550/14* (2013.01); *B60W 2550/40* (2013.01); *G05D 2201/0213* (2013.01)

(58) Field of Classification Search
CPC ......... B60W 2550/14; B60W 2550/40; B62D 15/025; G08G 1/0112; G08G 1/0129; G08G 1/096791; G08G 1/096775; G05D 1/0221; G05D 1/0274; G05D 1/0278; G05D 2201/0213; G05D 1/0088; G01C 21/34
See application file for complete search history.

(56) References Cited

U.S. PATENT DOCUMENTS 9,182,761 B2    11/2015  Fujita
2005/0004723 A1  1/2005  Duggan et al.
2010/0256852 A1* 10/2010 Mudalige ................ G08G 1/22
                                                        701/24

FOREIGN PATENT DOCUMENTS

JP   2005099930 A     4/2005
JP   2006322752 A    11/2006
JP   2008180591 A     8/2008
JP   2012051441 A  *  3/2012
WO   2013027803 A1    2/2013

OTHER PUBLICATIONS

<< Automotive technology : Driverless cars promise to reduce road accidents, ease congestion and revolutionize transport >>, The Economist, Technology Quarterly : Q3 2012, Sep. 1, 2012.

Jesse Levinson et al. : << Robust vehicle localization in urban environments using probabilistic maps >>, 2010 IEEE International Conference on Robotics and Automation, Anchorage, Alaska, May 8, 2010, pp. 4372-4378.

Jesse Levinson et al. : <<Map-based Precision Vehicle Localization in Urban Environments >>, Proceedings of Robotics : Science and Systems, Jun. 1, 2007.

Jesse Levinson et al., "Towards Fully Autonomous Driving: Systems and Algorithms", Intelligent Vehicles Symposium (IV), 2011 IEEE, Jun. 5, 2011, pp. 163-168, XP031999072.

* cited by examiner

AUTOMATIC DRIVING OF A ROUTE

FIELD OF THE INVENTION

The present invention relates to a technique for automatically driving a route. The present invention particularly relates to the automatic driving of a frequently driven route of public road traffic in a motor vehicle.

BACKGROUND INFORMATION

Automated driving functions require an accurate environmental and navigational map. Beyond the course of roads, which may already be sufficient for a navigation, such a map must also provide highly detailed and current data, which are required for guiding the motor vehicle, for instance, lane information, traffic regulations, current obstacles such as construction sites, and others. These data have to be able to be assigned at high geometric resolution of their positions on a road. Such map data are maintenance-intensive, require large memories for their storage and great bandwidths for their distribution. It is customary to keep in reserve directly only a part of these data onboard a motor vehicle and to request other data only when needed. The data, in this context, are usually exchanged in a wireless mode between the motor vehicle and surroundings or between vehicles at close range. So far, it is not clear how sufficiently great map coverage can be achieved in order to enable large-area, automated driving.

For the navigation of a motor vehicle, it is known that one should drive along a predetermined route in a so-called teach-in mode, in order to be able to use the route advantageously in later automated route navigation. A commuter, who drives the same route daily, may preferentially use a certain variant of the road routing, for example.

SUMMARY OF THE INVENTION

The present invention is based on the objective of indicating a technique for automated driving of a predetermined route. The objective is attained by a method, a computer program product and a device having the features of the independent claims. The further descriptions reflect further specific embodiments.

A method, according to the present invention, for the automatic driving of a predetermined route includes the steps of scanning route data and environmental data while the route is being driven manually, determining an automatic driving strategy based on the scanned data, comparing the automatic driving strategy to the manual driving strategy and enabling the automatic driving of the route when the automatic driving strategy differs by less than a predetermined measure from the manual driving strategy.

It was realized that a normal driver tends to drive along certain routes especially frequently. In order to relieve the driver in automated fashion in his driving activity, it is necessary to select an automated driving strategy which the driver himself also usually selects. Scanning route data and environmental data during manual driving of the route makes it possible to understand on what parameters the driver bases the selection of his manual driving strategy. The scanned route data and environmental data may be more current, more accurate and more relevant than data which are provided by a central station. This makes it possible to determine, at low expenditure, on the one hand, relevant local route data and environmental data of a predetermined route and, on the other hand, to imitate as accurately as possible the driving behavior of the driver. Increased safety may thereby be achieved during automated driving of the predetermined route.

In one specific embodiment, the automatic driving is enabled, at the earliest, after the route has been driven completely manually at least once. This makes it possible to prevent partial segments of the route from being combined to form an automatically driven route in a manner in which the driver himself would not combine such segments. Thus, use may be made of the circumstance that the driver of the frequently driven route has usually already evaluated every detail and every possible combination of road sections. Use may thus be made, in a discreet manner, of the collected stock of experience of the driver.

In one further specific embodiment, the route is driven manually more often than a predetermined number of times. Thereby it may be ensured that the route is a route which the driver already knows well himself, particularly a commuter route between a place of residence and a place of work. In addition, because of the frequent driving of the route, the quality of the scanned route data and environmental data may be raised. Singular, accidental or meaningless deviations from the desired driving route may thus be determined in a better manner and ignored.

In one further specific embodiment, features are determined from the scanned data, and the driving strategy is determined based on the determined features. The intermediate step of forming features, on the one hand, allows for a better understanding of which part of the manual driving strategy is formed on the basis of which route data and, on the other hand, the determined features may be compared or matched in an improved manner with stored features. The stored features may be stored in a map memory, for example.

In one variant, a determined feature and the scanned data on which the determination of the feature is based may be presented to the driver, and a confirmation of the determination may be scanned. In this way, the driver is able to understand the feature determination during or after the driving, and is able to evaluate it by his confirmation or the absence of a confirmation. In subsequent, similarly supported cases, an improved determination of features may thereby be made from scanned data.

In one variant, it may already be regarded as a confirmation of the feature if the automatic driving strategy, that was determined based on the determined feature, is identical to the manual driving strategy of the driver.

In another, further specific embodiment, the determined features may be made available outside the motor vehicle. Thus, in particular, current route data and environmental data may also be provided to other motor vehicles. In a corresponding manner, route data and environmental data may be received from other motor vehicles and used for determining the driving strategy or the choice of driving path on another route.

In one specific embodiment, features, which are determined based on route data and environmental data, are received by an external infrastructure, the driving strategy being determined based on the determined features. The driving strategy may be determined based on the features on the part of the motor vehicle. In one further specific embodiment, the driving strategy may also be determined, however, on the part of the infrastructure, and transmitted to the motor vehicle thereafter. The external infrastructure may include a central server or a service in a so-called cloud. In combination with the last-mentioned variant, this allows for a bidirectional exchange of features between motor vehicles, in order to be able to exchange the preprocessed route data and environmental data in an improved manner.

In one specific embodiment, the automatic driving of the route is allowed only within a predetermined time period after the last drive. For this purpose, an optional distinction may be made between manual and automated driving. This makes it possible to ensure that obsolete route data and environmental data are not used to determine the automatic driving strategy.

A computer program product according to the present invention includes a program code arrangement for carrying out the described method when the computer program product is run on a processing device or stored on a computer-readable data carrier.

A device according to the present invention, for the automatic driving of a predetermined route, includes a scanning device for scanning route data and environmental data while the route is being driven manually, and a processing device for determining an automatic driving strategy based on the scanned data. The processing device is configured, in this case, to compare the automatic driving strategy to the manual driving strategy and to enable an automatic driving of the route, based on the automatic driving strategy, if the automatic driving strategy differs from the manual driving strategy by less than a predetermined measure.

The present invention will now be described in greater detail with reference to the accompanying figures.

DETAILED DESCRIPTION

Figure 1:
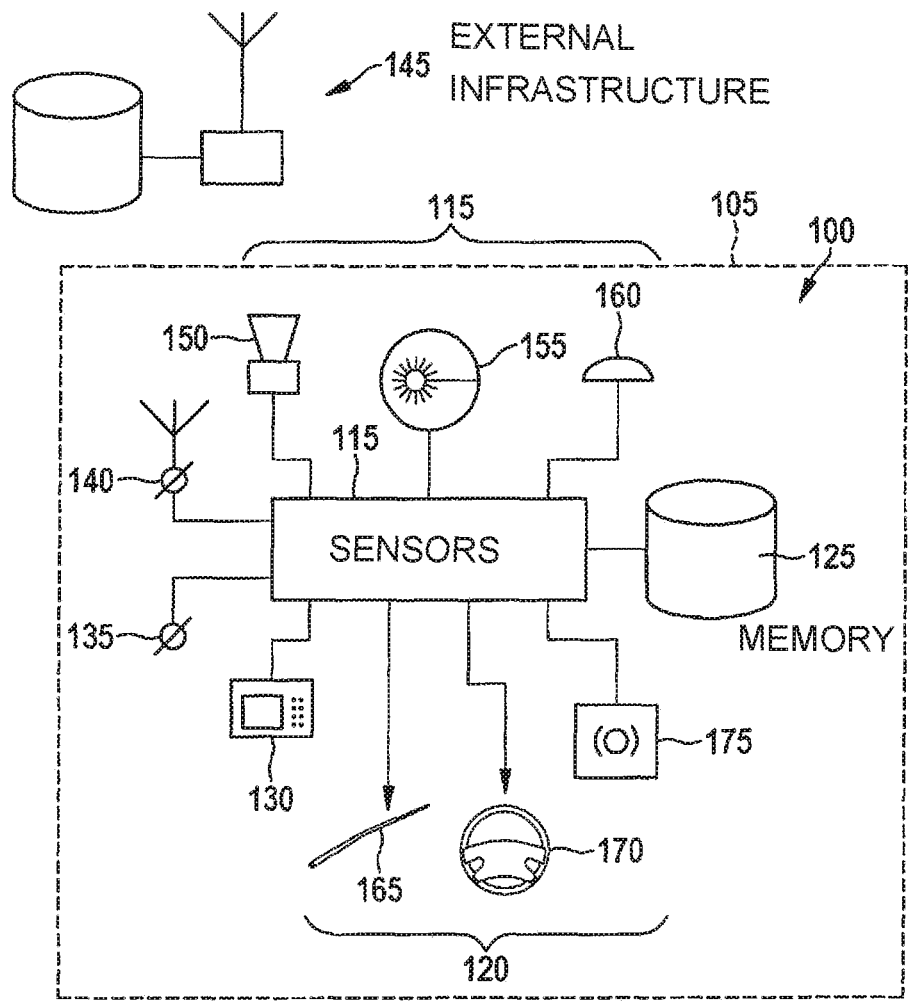
FIG. 1 represents a device for enabling automatic driving of a predetermined route.

FIG. 1 shows a device 100 onboard a motor vehicle 105. Device 100 is configured to enable automatic driving of a predetermined route. For this purpose, device 100 includes a processing device 112[1], which is connected to a number of sensors 115 and, if applicable, also actuators 120 as well as optionally to a memory 125. Furthermore, an operating element 130 may be provided for interaction with a driver of motor vehicle 105. Instead of operating element 130, a first interface 135 may also be provided, via which another unit, for instance, a smartphone, a portable computer or a tabloid PC may be linked as operating element 130. In addition, a second interface 140 may be provided, in order to establish a data connection to an external infrastructure 145. External infrastructure 145 may be a central server, a network of servers or a loose combination of servers networked in a data connection. Additionally or alternatively, external infrastructure 145 may also include one or more motor vehicles 105.

[1] Translator's Note: Reference numeral 112 and, later, step 265 could not be found in the figures.

In an exemplary manner, in the representation of FIG. 1, sensors 115 include a camera 150 for taking an optical image in the surroundings of motor vehicle 105, a laser scanner 155 for scanning distances from objects in the surroundings of motor vehicle 105 and a navigation receiver 160 for determining the position of motor vehicle 105. Navigation receiver 160 may particularly include a receiver for signals of a satellite-supported navigation system. On the basis of the data scanned by sensors 115, processing device 112 determines an automatic driving strategy. The driving strategy includes a travel route, which is characterized by using predetermined route sections in a predetermined sequence, and local driving decisions, such as a lane selection, driving around an obstacle or a reaction to a dynamic route control, in the form of a traffic light, for example.

In one specific embodiment, processing device 112 is also configured to control the automatic driving of the predetermined route by motor vehicle 105. For this purpose, actuators 120 may comprise a speed control 165, a directional control 170 and a deceleration control 175. Motor vehicle 105 is controlled as a function of the determined automatic driving strategy by corresponding effects of actuators 120.

Both sensors 115 and actuators 120 may be used to determine a manual driving strategy, which a driver of motor vehicle 105 pursues while he is driving a predetermined route manually, that is, without active interventions by device 100. For example, using navigation receiver 160, a route selection by the driver may be determined, and by a scanning of steering motions on directional control 170, a lane selection or a curve radius may be determined.

Both the sensors 115 and the actuators 120, which are shown in FIG. 1, are only examples of sensors and actuators that may be used. In other specific embodiments, other sensors 115 or actuators 120 may be used additionally or alternatively to the ones shown.

Figure 2:
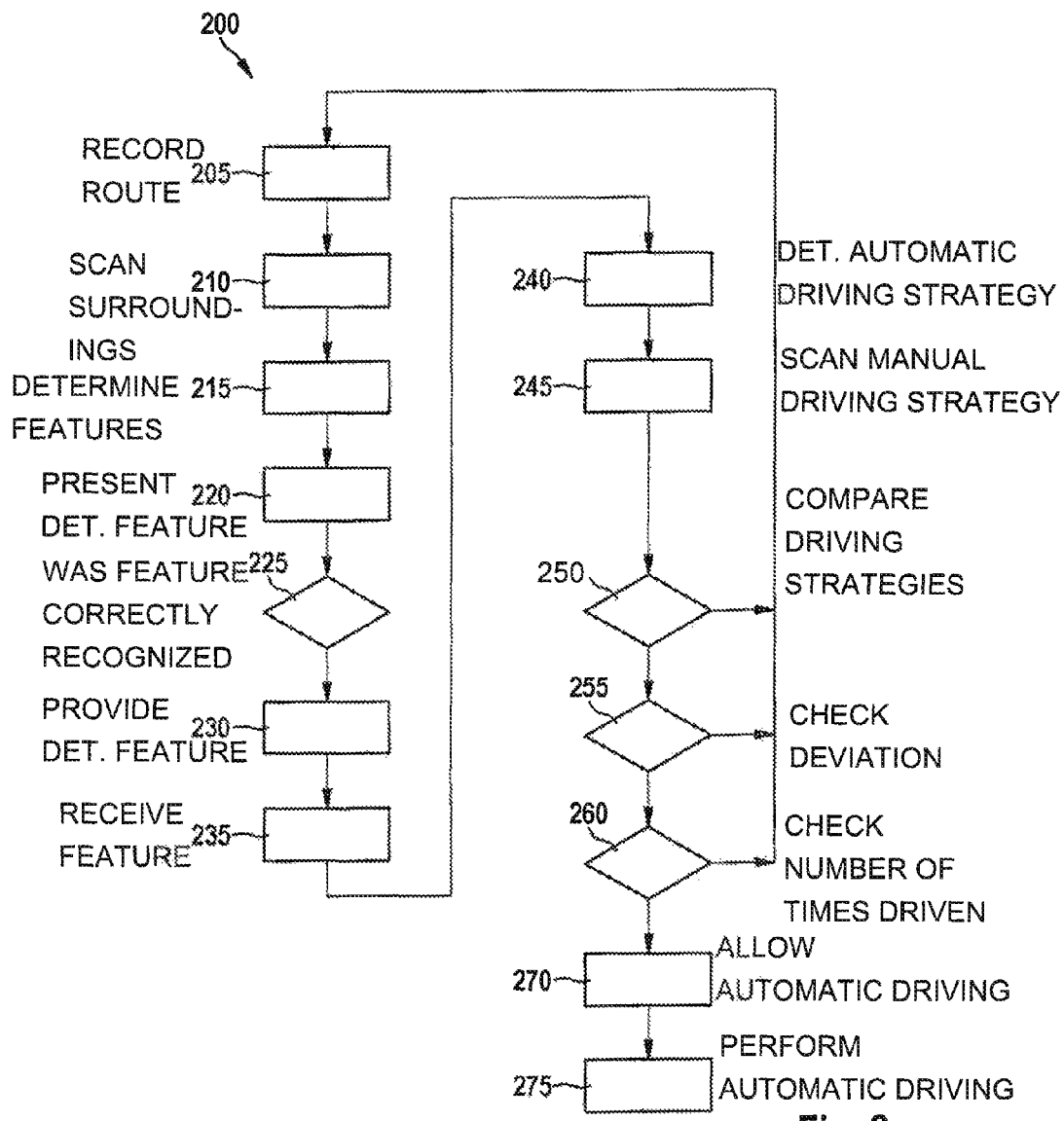
FIG. 2 represents a flow chart of a method for enabling automatic driving of a predetermined route.

FIG. 2 shows a schematic flow chart of a method 200 for enabling an automatic driving of a predetermined route. Method 200 is in particular configured to be carried out on processing device 112 of FIG. 1.

In a first step 205, the driving of a predetermined route is recorded. The predetermined route may be characterized in that it is driven frequently, and furthermore may be driven regularly. Particularly a route which is driven regularly at a first predetermined time of day in a first direction and at a second predetermined time in the opposite direction may be used as a predetermined route. Such a route is driven by a commuter, for example, between his place of residence and his work place, but other frequently used routes are also possible. In one variant, different routes of going to a destination and returning from the destination may also be supported.

In a following step 210, the surroundings of motor vehicle 105 are scanned while the predetermined route is driven manually. For this purpose, the signals of sensors 115 may be evaluated, in particular. Interventions by the driver using one of actuators 120 may also be scanned, if required. Actuators 120 may be configured for this purpose as sensors 115, or appropriate sensors 120, having no actuator function, may be used. In one specific embodiment, the scanned signals are correlated with data from memory 125, for instance, a threshold value or an actuation profile.

In a step 215, based on the scanned data, features are determined of the surroundings of motor vehicle 105. From the scanned route data and environmental data, features are determined such as a road routing, a route selection, a local traffic control, a current traffic control, a temporary obstacle and other relevant features. In an optional step 220, a determined feature and the data, on the basis of which it was determined, may be presented to the driver of motor vehicle 105. In the flow chart shown, this may occur during the manual driving of the predetermined route, and in another specific embodiment, both the data and the determined feature may also be stored and presented to the driver at a later time for confirmation or correction. The confirmation by the driver may particularly be performed manually. For example, a recognized feature may include a traffic light having a current signal color. A traffic light shown in stylized fashion may be presented to the driver, and the driver is able to classify the recognized feature as correct or incorrect by pressing a key, for example.

In a further specific embodiment, a plurality of possible features may be determined on the basis of the same data, and the driver may make a selection of the correct feature. In still another specific embodiment, the driver may also be prompted himself to classify as a feature a feature that is not recognized on the basis of data recognized as relevant.

In a step 225, it is checked, if necessary, whether the feature in question was correctly recognized. Besides the manner by active intervention of the driver described above, a correct recognition of a feature may also be confirmed by the fact that it results in an automatic driving strategy that matches the manual driving strategy of the driver, as will be described in greater detail below with reference to step 250. In an optional step 230, the detected feature may be provided, for example, to external infrastructure 145 via second interface 140. In a corresponding manner, a feature may also be received from external infrastructure 145 in a likewise optional step 235. Based on the determined features, an automatic driving strategy is determined in a step 240. Furthermore, in a step 245, the manual driving strategy is scanned which the driver pursues when driving the route. For this purpose, data of sensors 115 and actuators 120 may be utilized.

In a step 250, the automatic driving strategy and the manual driving strategy are compared to each other. In a step 255, a check is then performed to determine whether a deviation of the driving strategies exceeds a predetermined threshold value. If this is not the case, method 200 may branch back to the beginning and be run through again. Otherwise a check may be performed in an optional step 260 to determine whether the predetermined route was driven more often than a predetermined number of times. In a step 265, a check may also be performed to determine whether the last drive on the predetermined route occurred more recently than a predetermined time in the past. If one of the queries of steps 260 or 265 is answered in the negative, method 200 is able to branch back to the beginning and be run through again. Otherwise, in a step 270, the automatic driving of the predetermined route may be allowed. Optionally, in a step 275, the automatic driving may also be carried out within the scope of method 200.

Figure 3:
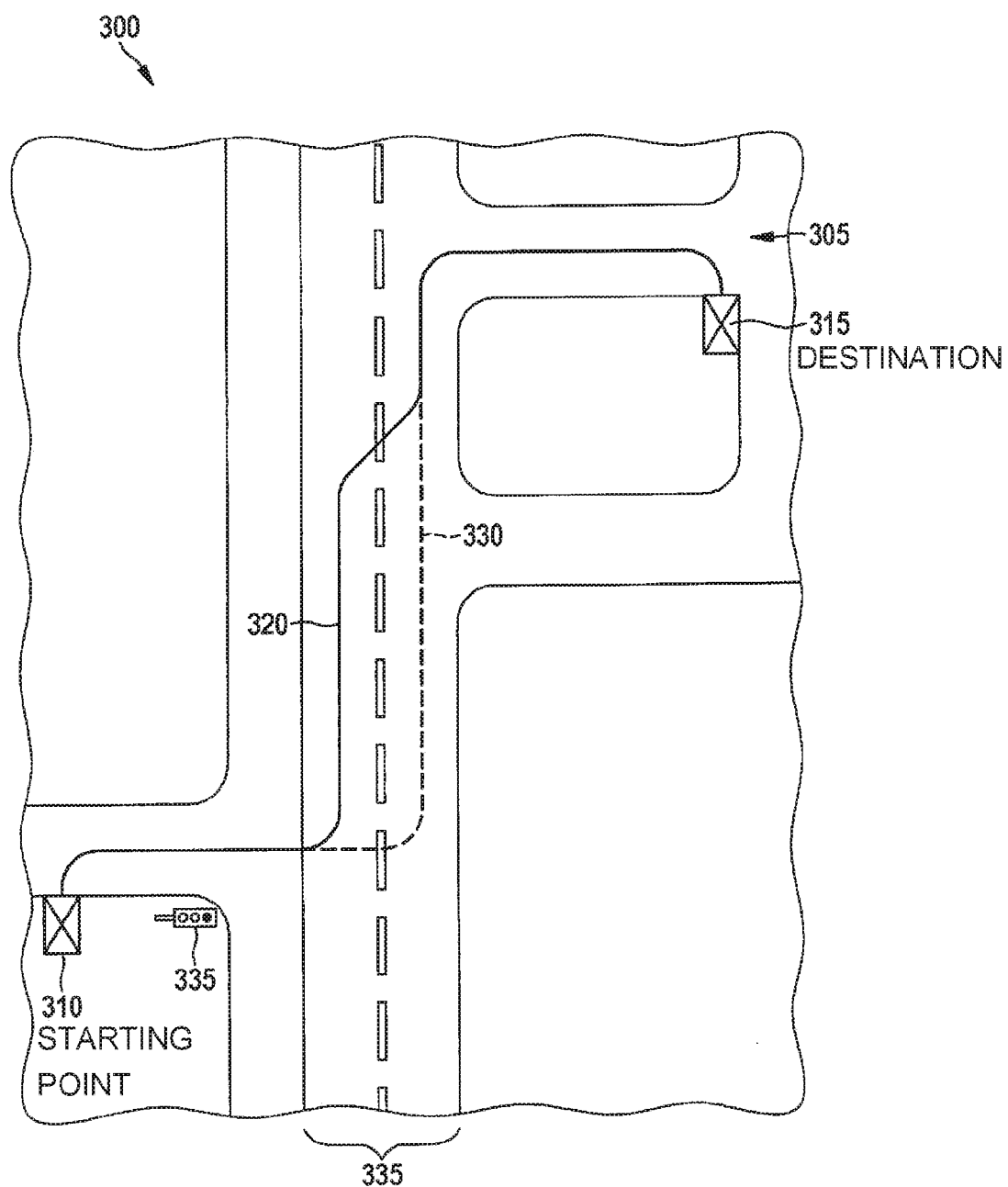
FIG. 3 represents a schematic driving of a predetermined route, in exemplary fashion.

FIG. 3 shows an exemplary illustration 300 of driving a predetermined route 305 between a starting point 310 and a destination 315. A first driving strategy 320 may be determined manually, for example, and a second driving strategy 330 may be determined automatically. The two driving strategies 320 and 330 differ in the present illustration by a lane selection in the vertical section of route 305. Both driving strategies are formed on the basis of features 335, of which, in this case, only a traffic light and a two-lane travel route are shown in exemplary fashion.

The existing difference between driving strategies 320 and 330 may be rated as sufficiently slight to enable driving from starting point 310 to destination 315 by an automated driving function, particularly a longitudinal and a transverse control system on board motor vehicle 105.

What is claimed is:

1. A method for automatically driving a vehicle along a predetermined route, the method comprising:
scanning, via a scanning arrangement, route data and environmental data, while the predetermined route is first being driven manually by a driver of the vehicle without active interventions by the vehicle;
determining, via a processor, an automatic driving plan based on the scanned data;
comparing, via the processor, the automatic driving plan to a manual driving plan based on the vehicle being driven manually by the driver of the vehicle;
enabling, via the processor, the automatic driving along the predetermined route based on the automatic driving plan, if the automatic driving plan differs by less than a predetermined measure from the manual driving plan; and
controlling the vehicle as a function of the determined automatic driving plan;
wherein the driving plan includes a travel route, which includes predetermined route sections in a predetermined sequence, and local driving decisions,
wherein the predetermined route is driven more than once,
wherein the scanning arrangement is coupled to the processor,
wherein the scanning arrangement includes a camera for taking an optical image in surroundings of the vehicle, and a navigation receiver for determining a position of the vehicle,
wherein at least one characteristic of the surroundings is determined from the scanned data, and wherein the driving plan is determined based on at least one determined characteristic, and wherein the characteristics include at least one of a road routing, a route selection, a local traffic control, a current traffic control, a temporary obstacle, and
wherein the at least one determined characteristic and the scanned data on which the determination of the characteristic is based are presented to the driver and a confirmation of the determination is scanned.

2. The method of claim 1, wherein the automatic driving is enabled only if the route has been manually driven at least once.

3. The method of claim 2, wherein the route is driven manually more often than a predetermined number of times.

4. The method of claim 1, wherein the at least one determined characteristic is made available outside a motor vehicle.

5. The method of claim 1, wherein at least one characteristic of the surroundings, which is determined based on route data and environmental data, are received by an external infrastructure and the driving plan is determined based on at least one determined characteristic.

6. The method of claim 1, wherein the automatic driving along the route is enabled only within a predetermined time period after a last drive.

7. A non-transitory computer readable medium having a computer program, which is executable by a processor, comprising:
a program code arrangement having program code for automatically driving a vehicle along a predetermined route, by performing the following:
scanning, via the processor, route data and environmental data, while the predetermined is first being driven manually by a driver of the vehicle without active interventions by the vehicle;
determining, via the processor, an automatic driving plan based on the scanned data;

comparing, via the processor, the automatic driving plan to a manual driving plan based on the vehicle being driven manually by the driver of the vehicle; and enabling, via a processor, the automatic driving along the predetermined route based on the automatic driving plan, if the automatic driving plan differs by less than a predetermined measure from the manual driving plan; and controlling the vehicle as a function of the determined automatic driving plan;

wherein the driving plan includes a travel route, which includes predetermined route sections in a predetermined sequence, and local driving decisions, wherein the predetermined route is driven more than once, wherein the scanning arrangement is coupled to the processor, and wherein the scanning arrangement includes a camera for taking an optical image in surroundings of the vehicle, and a navigation receiver for determining a position of the vehicle, wherein at least one characteristic of the surroundings is determined from the scanned data, and wherein the driving plan is determined based on at least one determined characteristic, and wherein the characteristics include at least one of a road routing, a route selection, a local traffic control, a current traffic control, a temporary obstacle, and wherein the at least one determined characteristic and the scanned data on which the determination of the characteristic is based are presented to the driver and a confirmation of the determination is scanned.

8. A device for automatically driving a vehicle along a predetermined route, comprising:

a scanning arrangement for scanning route data and environmental data, while the predetermined is first being driven manually by a driver of the vehicle without active interventions by the vehicle;

a processing device, including a processor, for determining an automatic driving plan based on the scanned data, wherein the processing device is configured to compare the automatic driving plan to a manual driving plan based on the vehicle being driven manually, and to enable an automatic driving along the predetermined route based on the automatic driving plan, if the automatic driving plan differs by less than a predetermined measure from the manual driving plan;

wherein the processing device is further configured to control the vehicle as a function of the determined automatic driving plan, wherein the driving plan includes a travel route, which includes predetermined route sections in a predetermined sequence, and local driving decisions, wherein the predetermined route is driven more than once, wherein the scanning arrangement is coupled to the processor, and wherein the scanning arrangement includes a camera for taking an optical image in surroundings of the vehicle, and a navigation receiver for determining a position of the vehicle, wherein at least one characteristic of the surroundings is determined from the scanned data, and wherein the driving plan is determined based on at least one determined characteristic, and wherein the characteristics include at least one of a road routing, a route selection, a local traffic control, a current traffic control, a temporary obstacle, and wherein the at least one determined characteristic and the scanned data on which the determination of the characteristic is based are presented to the driver and a confirmation of the determination is scanned.

* * * * *